Figure 1:
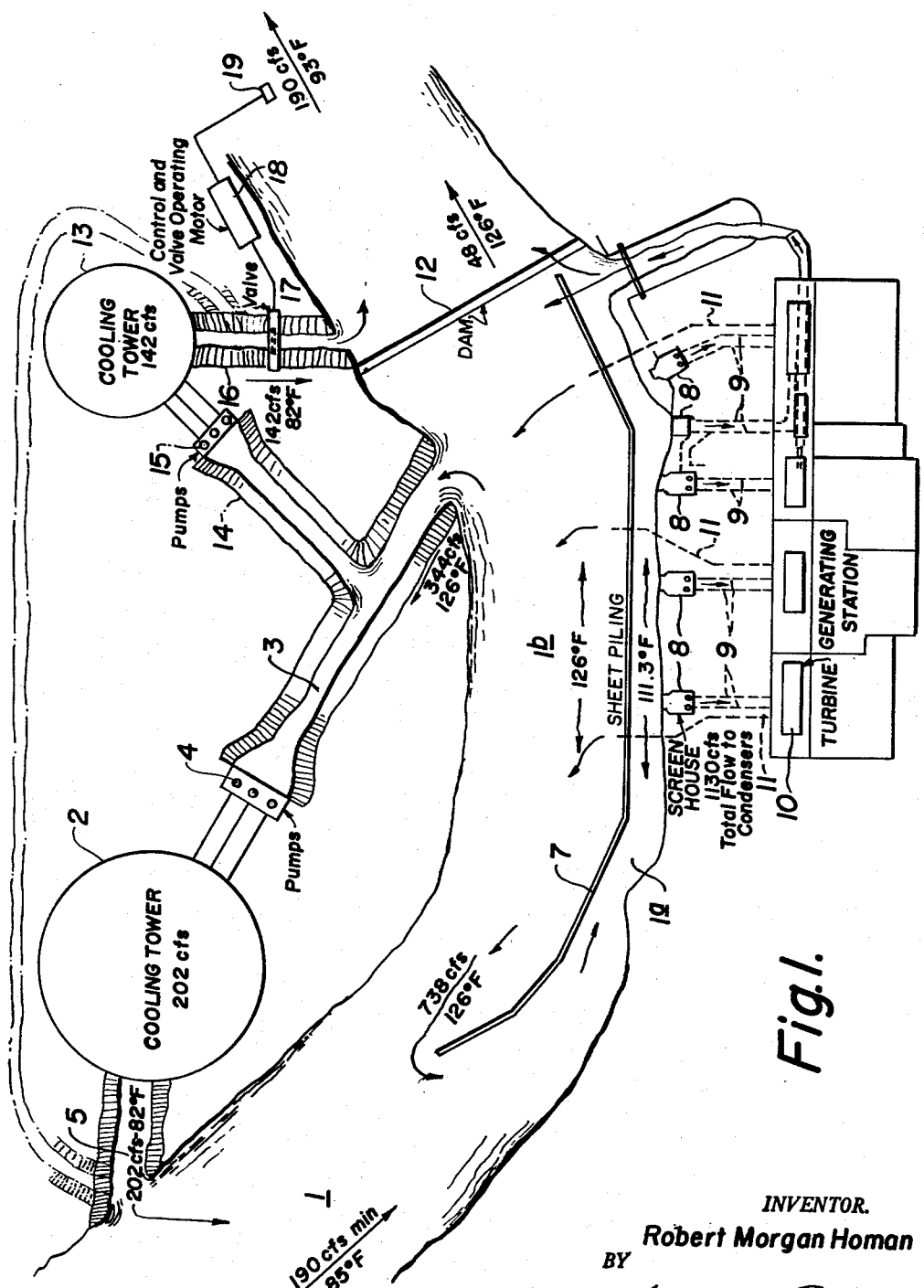

INVENTOR.
Robert Morgan Homan

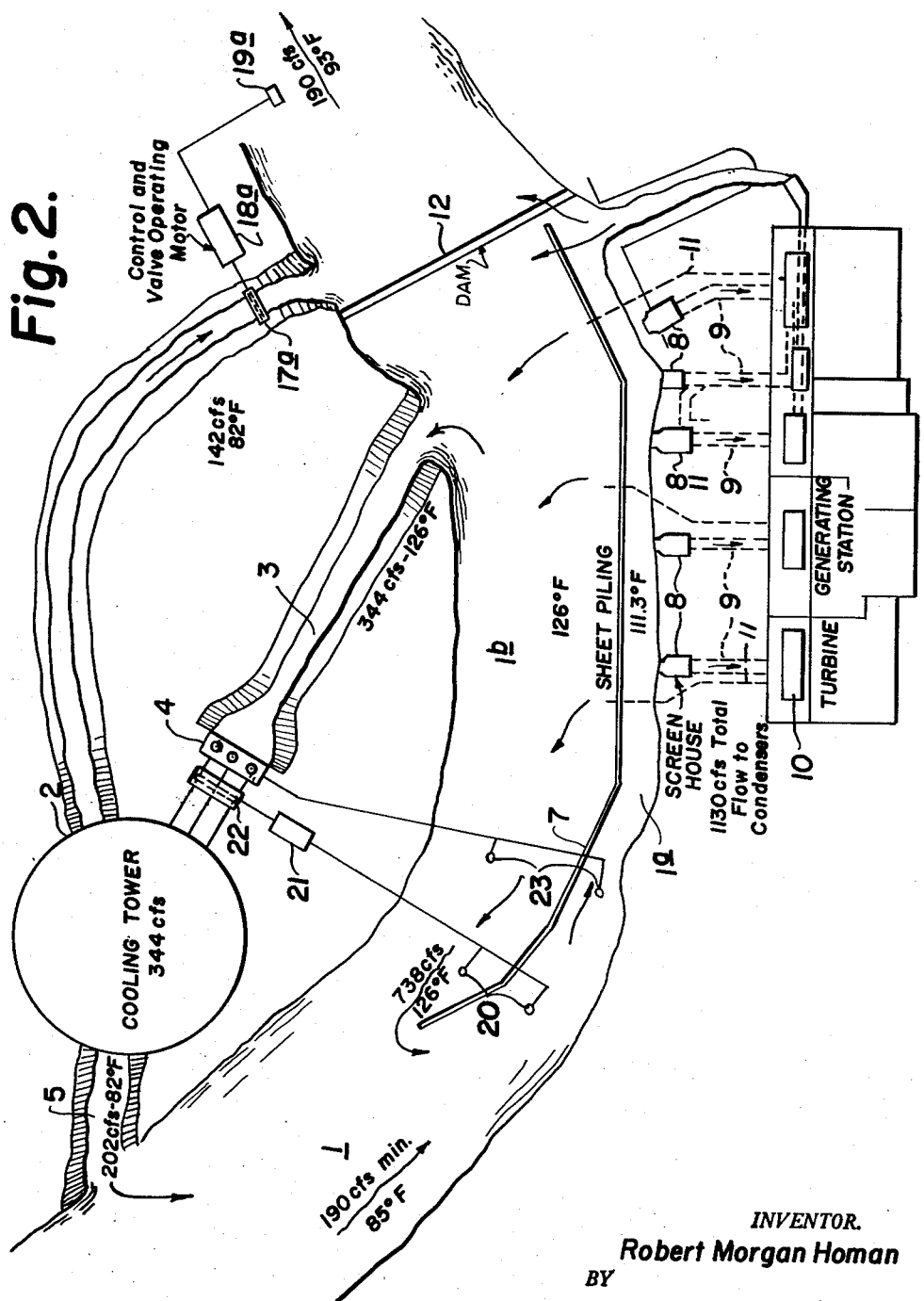

United States Patent Office 3,061,276
Patented Oct. 30, 1962

3,061,276
RIVER WATER TEMPERATURE CONTROL SYSTEM
Robert Morgan Homan, Terre Hill, Pa., assignor to Gilbert Associates Inc., Reading, Pa.
Filed Feb. 2, 1960, Ser. No. 6,164
11 Claims. (Cl. 257—310)

This invention relates to a system for the control of river water temperature, more particularly, to prevent increase of river water temperature above a predetermined maximum allowable value as a consequence of discharge of heated water from a plant located along the river having units (such as turbines) which are cooled by river water.

In the past, power generating stations and manufacturing plants located along the banks of a river and using river water for cooling units, such as turbines, have oftentimes discharged heated water at such high temperature, particularly when the flow rate of the river dropped to a low value, so as to endanger fish life in the river or exceed the maximum allowable temperature permitted by the municipality or state.

Attempts have been made to correct this situation by cooling the river water used in the plant by means of cooling towers, however, these do not constitute the absolute control desired by reason of inability to properly distribute river flow and cooling tower flow to fully achieve the desired result of accurate and predictable temperature conditions.

An object of my invention is to provide a novel system for controlling the temperature of river water so as to overcome the above mentioned disadvantages of conventional systems and so as to prevent either an increase or decrease of the downstream temperature from a predetermined optimum temperature, in spite of fluctuations in the flow rate of the river or fluctuations in the temperature of effluent from the plant, so as to not only keep the downstream temperature at the predetermined allowable maximum, but, at the same time, maintain circulating water conditions necessary to maximum efficiency of plant operation with the cooling tower equipment available, as previously determined by economic studies governing the cooling tower installation.

A further object of my invention is to automatically maintain a predetermined temperature differential between inlet and outlet circulating water temperature of the condensers, as required to absorb the heat rejected by the turbine to the circulating water, and, at the same time, obtain efficient operation of turbine generators or condensers of a power plant or other similar condensing or cooling systems.

A still further and more specific object is to provide a river water temperature control system embodying barrier means to effect ponding to maintain two predetermined different temperatures for the intake and exhaust of devices requiring liquid cooling, such as turbines, to provide maximum efficiency in operation as well as reliable temperature control.

Other objects and advantages will become apparent from a study of the following description taken with the accompanying drawings wherein:

FIGURE 1 is a schematic plan view showing a river temperature control system having two cooling towers and embodying the present invention, and FIGURE 2 is a schematic plan view of a modification of the invention embodying only one cooling tower and showing a modified control system.

The process or system embodying the present invention is applicable to any type of plant which utilizes river water for cooling purposes and which, upon returning the heated water to the river, creates an excessively high temperature in the downstream flow. By excessively high temperature is meant heat pollution or a temperature rise in the downstream flow beyond the allowable limit as established in the particular commonwealth or state.

FIGURE 1 schematically illustrates a system in accordance with the invention embodying a method of establishing a fixed turbine back-pressure and circulating water temperature for any plant, and, at the same time, regulating downstream temperature of the river 1 at a predetermined design value by the installation of cooling towers, such as 2 and 13, and a control valve 17 for regulation purposes.

As an example, the system and arrangement illustrated are based on a specific plant or generating station 10 located on a river with a minimum flow of 190 cu. ft. per second, in the direction shown by the arrow, at a maximum temperature of 85° F. which is introduced through inlet conduits 8 and 9. The plant circulating water requirements are assumed to be 1130 cu. ft. per second. Cooling towers, such as 2 and 13, have been selected on the basis of an economic study and are proportioned to accomplish the following with the river conditions given and at times of maximum wet bulb and relative humidity conditions, in this case 65° F, and 68%, respectively.

(1) Maintain pond temperature (that is, the temperature of the portion of the river water 1b which is recirculated, treated by the cooling towers and reused in the plant when the river flow is too low) and corresponding circulating water temperature and condenser exhaust pressure at a predetermined value. In this instance, a condenser exhaust pressure at 5.0″ has been selected as a point of maximum economy for the conditions given.

(2) Regulate flow from the cooling towers and quantity of cooled water required to maintain an average downstream river temperature, in this example, of 93°, as shown.

The determination of the size of the cooling towers 2 and 13 is arrived at on the basis of the above mentioned back-pressure and the amount of heat rejected from the turbine exhaust 11 to the circulating water. In this example, the rejected heat amounts to 3,740,000,000 B.t.u. per hour. Water is cooled in the cooling towers to 82° F. representing an approach of 17° when compared to 65° wet bulb temperature. In this instance, in addition to 190 c.f.s. of river water at 85° F. a sufficient quantity of water from the condensers (126° F.) is cooled to 82° F. to permit absorption of the heat rejected from the turbine, such as 10, with an overall increase in temperature of the circulating water to 126° F.

The separation of cooled circulating water to the condensers (111.3° F.) from the heated discharge water from the condensers (126° F.) is accomplished by a separation wall consisting of a row of sheet piling 7, or equivalent barrier, running lengthwise of the river and driven to an elevation just above the surface of the water.

The summation of the heat required to raise 202 cu. ft. per second of cooling tower effluent at a temperature of 82° F. to 126° F. plus the heat required to raise 190 cu. ft. per second of river flow at a temperature of 85° to 126°, is equivalent to the amount of heat discharged from the turbine steam to the circulating water through the condenser. In order to obtain a flow of 1130 c.f.s. to the plant condensers, the 202 c.f.s. quantity of cooling tower effluent and 190 c.f.s. of river flow is supplemented with 738 c.f.s. of pond water (circulating water discharge from the condenser) at 126° to achieve a resultant total flow to the condenser of 1130 c.f.s. at 111.3° F. at the other side of sheet piling 7. The increase in temperature of this total circulating water quantity from 111.3° F. to 126° F. is again sufficient to absorb all of the heat rejected to the circulating water from the turbine.

The second of the two objectives of the cooling tower installation is accomplished by the smaller (13) of the two cooling towers 2 and 13, referred to hereafter as the downstream cooling tower with a capacity of 142 c.f.s. per second. Again, water is supplied through conduit 14 to the cooling tower from the pond 1b at 126° and cooled to 82° F. in a quantity sufficient that when mixed with 48 c.f.s of overflow from the dam 12 at 126° F. the resultant mixture will be 190 c.f.s. at 93°. Obviously this downstream discharge is equivalent to the incoming river flow.

The foregoing objectives are attainable as water flow is controlled in the manner indicated in FIGURE 1 and in the quantities indicated. In practical application and due to the irregularities of river contours, local climatologic conditions, and reasons outside of design control, these flows are never realized in the precise desgin quantities indicated. It can be expected that some portion of the cooling tower effluent at 82° and the river flow at 85° F. will find its way into the heated water zone 1b, referred to as the pond, with the result that the water flowing over the dam 12 could be any temperature less than the design value of 126° F. If the downstream cooling tower 13 is permitted to operate and freely discharge 142 c.f.s. of water cooled at 82° F., the resultant downstream flow quantity would still be 190 c.f.s., but at a temperature lower than the regulated value of 93° F. This lower downstream temperature is uneconomical.

To permit precise regulation of downstream river temperature, with the aforementioned conditions of river irregularities, a flow regulating valve 17 is placed in the cooling tower discharge effluent line to regular flow from the downstream cooling tower to the river to the quantity needed to accomplish the resultant downstream temperature of 93° F. with water flow over the dam 12 varying correspondingly to produce a total downstream flow of 190 c.f.s. This flow regulating valve 17 is operated through any suitable control system including motor drive 18, of any well known type, actuated from a temperature measuring device 19 installed downstream to determine the downstream river temperature. As this downstream river temperature changes from 93°, and a decrease of temperature occurs, the cooling tower flow to the river would be reduced to the quantity required to accomplish the design result of 93° F. downstream river temperature mentioned previously and the balance of cooled water could be circulated for plant use.

With the downstream cooling tower still operating to produce 142 c.f.s. of cooled water at 82° F. the balance of the water not passed through the flow regulating valve 17 would be discharged upstream through a suitable channel (not shown) connecting conduits 16 and 5 and would supplement the 202 c.f.s. of cooling tower effluent 82° F. from the upstream pond cooling tower 2. By virtue of this flow upstream, sufficient cooled water is made available to permit maintaining the desired objectives at the precise values selected. To repeat, the objectives are the ability to hold the temperature of circulating water to condensers at the proposed temperature of 111.3° F. and the temperature of the discharge water from the condensers at 126° F., as designed.

At such times as the river flow increases beyond the minimum flow of 190 c.f.s. selected in the above described example, the temperature measuring device 19 which actuates the flow regulating valve 17 can be extended in service to stop one or more of the cooling tower multiple pumps 4 and 15 which are required to supply water to the downstream cooling tower 13. At such time as the flow quantity through the regulating valve 17 is reduced to zero, that is, the valve is entirely closed, the river temperature measuring device 19 will shut down the multiple cooling tower pumps 4 and 15 in sequence so long as the downstream temperature remains below 93° F. The pond cooling tower 13 could be maintained in service at the discretion of the plant operators to maintain values of pond temperatures (within the limit of cooling tower capability) most suitable to plan operation. The cooling tower pump serving the pond cooling tower can be operated manually or automatically, remotely.

An important feature of the present invention is the addition of a flow regulating valve 17, positioned by temperature controlled devices 18, and the control of the flow from this regulating valve to maintain pond and downstream conditions at precise design values, rather than at approximate values resulting from stream irregularities, the control of which would otherwise be beyond the scope of a practical design.

Another important feature of the invention is the use of the separation barrier 7, indicated on the drawing as sheet piling, or the equivalent structure, to effect a separation between cooled water supplied to the condensers and the heated water discharged from the condensers.

FIGURE 2 shows a modification of the invention wherein the capacity of the downstream cooling tower and the pond cooling tower are combined into one, and with sufficient flow diverted by means of the regulating valve 17a actuated by controls 18a controlled by a temperature measuring device 19a, as described previously, to maintain downstream temperature at the design value, and with pond temperature controlled from the cooled (1a) or heated (1b) water side of the sheet piling barrier 7 by means of a second temperature measuring device comprising temperature controls 20 to control an electrical regulating device 21 for actuating a valve 22 (or valves) for regulating flow to the cooling tower, or temperature controls 23 for regulating the output capacity of the cooling tower pumps 4.

The circles in FIGURES 1 and 2 signify cooling towers and are marked accordingly. These circles are merely symbolic since because of design or capacity limitations, each circle means one or more cooling towers, as required.

If desired, cooling tower 2 and its inlet 3 and discharge 5 may be omitted from the system shown in FIG. 1 which would leave only the cooling tower 13 to effect temperature control downstream of the river. Similarly, the discharge outlet at 5 may be omitted from the system shown in FIG. 2 so that the cooled water is discharged only downstream of the dam.

Moreover the flow regulating valves may be located on either the inlet or discharge side of the cooling towers shown in FIGS. 1 and 2.

Of course, other conventional types of coolers may be used instead of cooling towers. Moreover, other temperatures than those assumed above may be maintained downstream or on opposite sides of barrier or piling 7.

In some instances an additional by-pass channel for river water may be provided and selectively used, from a point upstream of conduit 5 to a point downstream of conduit 16, to divert and provide a parallel path for a portion of the river water, as shown in dotted outline in FIG. 1.

Thus it will be seen that I have provided an efficient river water temperature regulating system which is highly reliable to assure that downstream temperatures will not exceed safe or permissible values, and which is effective to maintain predetermined different temperatures for the turbine intake and turbine exhaust, cooling conduits and controls to maintain maximum efficiency in operation, and which system is extremely flexible so that it will automatically compensate for wide fluctuations in the rate of flow of river water and in the amount of heat dissipated in the river water after it is ponded.

While I have illustrated and described several embodiments of my invention, it will be understood that these are by way of illustration only, and that various changes and modifications may be made within the contemplation of my invention and within the scope of the following claims.

I claim:

1. A river water temperature control system comprising a barrier extending longitudinally of and vertically in the river to provide two substantially separate bodies of river water, a plant located on the bank of the river and adapted to be cooled by said river water, said plant having a river cooling water plant inlet located on one side of said barrier and a river water plant outlet on the other side thereof, refrigerating means on the bank of the river through which portion of said river water plant outlet is diverted and cooled and thereafter discharged in said river, a dam extending across said river on the downstream side of and adjacent said barrier valve means for controlling the flow of said last mentioned portion of said river water plant outlet, and temperature responsive means in said river downstream of said dam for controlling said valve means so as to maintain downstream river water temperature within predetermined limits.

2. A river water temperature control system comprising a barrier extending longitudinally of and vertically, in the river to provide two substantially separate bodies of river water, a plant located on the bank of the river and adapted to be cooled by said river water, said plant having a river cooling water plant inlet located on one side of said barrier and a river water plant outlet on the other side thereof, refrigerating means on the bank of the river through which portion of said river water plant outlet is diverted and cooled and thereafter discharged in said river, a dam extending across said river on the downstream side of and adjacent said barrier, said refrigerating means having a second discharge outlet on the downstream side of said dam, a valve contained in said second discharge outlet, and temperature responsive means in said river, downstream of said dam, for selectively opening and closing said valve to regulate the flow of refrigerated water through said second discharge outlet and thereby maintain said downstream temperature of the river water below a predetermined limit.

3. A river water temperature regulating system comprising sheet piling extending vertically and longitudinally of the river stream so as to divide the stream into two separate bodies, namely a river water pond discharge portion and a river water inlet portion, an industrial plant on the river bank having units requiring cooling by said river water, said units having river water inlet conduits communicating with said inlet portion and river water outlet conduits communicating with said pond discharge portion of the river water, a dam downstream of and adjacent said barrier, cooling tower means on the bank of the river through which said pond discharge portion of the river water is diverted and having a discharge outlet for discharging cooled river water upstream of said plant, and flow regulating means in said diverted portion, and means responsive to the temperature of said river water pond discharge portion for controlling said flow regulating means for regulating the amount of flow of cooled river water discharged by said cooling tower into the river.

4. A river water temperature regulating system comprising sheet piling extending vertically and longitudinally of the river stream so as to divide the stream into two separate bodies, namely a river water pond discharge portion and a river water inlet portion, an industrial plant on the river bank having units requiring cooling by said river water, said units having river water inlet conduits communicating with said inlet portion and river water outlet conduits communicating with said pond discharge portion of the river water, a dam downstream of and adjacent said barrier, a cooling tower on the bank of the river through which a portion of said river is diverted to effect cooling of the river water, said cooling tower having an inlet supplied by river water from said pond discharge portion and having an outlet upstream of said plant a second cooling tower having an inlet communicating with said first mentioned inlet and having an outlet discharging cooled water downstream of said dam, said last mentioned outlet including a valve, means for regulating the flow of cooled river water through said valve including temperature responsive means downstream of said dam for maintaining downstream river temperature below a predetermined value.

5. A river water temperature regulating system comprising sheet piling extending vertically and longitudinally of the river stream so as to divide the stream into two separate bodies, namely a river water pond discharge portion and a river water inlet portion, an industrial plant on the river bank having units requiring cooling by said river water, said units having river water inlet conduits communicaitng with said inlet portion and river water outlet conduits communicating with said pond discharge portion of the river water, a dam downstream of and adjacent said barrier, a cooling tower on the bank of the river through which a portion of said river is diverted to effect cooling of the river water, said cooling tower having an inlet supplied by river water from said pond discharge portion and having an outlet upstream of said plant, a second discharge outlet for said cooling tower directly connected downstream of said dam a valve in said second discharge outlet, and means responsive to the temperature of the river water downstream of said dam for regulating said valve and thus the extent of cooling of the river water effected by cooled water discharged therein from said second discharge outlet.

6. A river water temperature regulating system comprising sheet piling extending vertically and longitudinally of the river stream so as to divide the stream into two separate bodies, namely a river water pond discharge portion and a river water inlet portion, an industrial plant on the river bank having units requiring cooling by said river water, said units having river water inlet conduits communicating with said inlet portion and river water outlet conduits communicating with said pond discharge portion of the river water, a dam downstream of and adjacent said barrier, a cooling tower on the bank of the river through which a portion of said river is diverted to effect cooling of the river water, said cooling tower having an inlet supplied by river water from said pond discharge portion and having an outlet upstream of said plant, a second discharge outlet for said cooling tower directly connected downstream of said dam, a valve in said second discharge outlet, valve operating means, and means responsive to the temperature of river water downstream of said dam to control said valve operating means so as to regulate the flow of cooled river water therethrough and maintain the downstream temperature of river water within predetermined limits.

7. A river water temperature regulating system comprising sheet piling extending vertically and longitudinally of the river stream so as to divide the stream into two separate bodies, namely a river water pond discharge portion and a river water inlet portion, an industrial plant on the river bank having units requiring cooling by said river water, said units having river water inlet conduits communicating with said inlet portion and river water outlet conduits communicating with said pond discharge portion of the river water, a dam downstream of and adjacent said barrier, a cooling tower on the bank of the river through which a portion of said river is diverted to effect cooling of the river water, said cooling tower having an inlet supplied by river water from said pond discharge portion and having an outlet upstream of said plant, a second discharge outlet for said cooling tower directly connected downstream of said dam, a valve and operating means therefor in said second discharge outlet, means responsive to the temperature of river water downstream of said dam to control said valve operating means so as to regulate the flow of cooled river water through said second discharge outlet and maintain the downstream temperature of river water within predetermined limits, and flow regulating means in said cooling tower inlet, and temperature responsive means in said river water pond discharge portion for controlling said flow regulating means for regulating the amount of flow through said cooling tower upstream outlet.

8. A river water temperature regulating system comprising a wall extending vertically in the river intermediate its width and along a portion of its length for separating such portion into two separate, communicating bodies of water, a dam downstream and adjacent the end of said wall, condenser means located on the bank of the river, cooling means for said condenser means drawing in river water from the river body on one side of said wall and discharging heated river water into the river body on the other side of said wall, a cooling tower located on said bank including conduit means for drawing in heated river water from said river body on said other side of said wall, cooling it and discharging it into the river and flow regulating means in said conduit means, and temperature responsive means downstream of said dam for controlling said flow regulating means for regulating the amount of cooling water discharged by said cooling tower into the river.

9. A river water temperature regulating system as recited in claim 8 together with a second cooling tower located on the river bank and drawing in said heated river water from said other side of said wall, cooling it and discharging cooled river water upstream of said wall.

10. A river water temperature regulating system recited in claim 8 wherein said flow regulating means is a valve which is operated by said temperature responsive means for regulating the flow of cooling water discharged by said cooling tower into the river.

11. A river water temperature regulating system as recited in claim 10 wherein said valve is located in the discharge portion of said conduit means and said discharge portion communicates with the river downwstream of said dam.

References Cited in the file of this patent

UNITED STATES PATENTS 2,426,765    Dorer _____ Sept. 2, 1947

OTHER REFERENCES

Selection and Application of Cooling Tower, pages 38 to 44 of November 1957 issue of publication "Combustion."